United States Patent
Shih et al.

(10) Patent No.: US 7,654,860 B2
(45) Date of Patent: Feb. 2, 2010

(54) SIGNAL TRANSMISSION WIRE WITH AN AUDIO INTERFACE AND A USB INTERFACE

(75) Inventors: Hsuan-ming Shih, Shen Zhen (CN); Dezhong Zhu, Shen Zhen (CN)

(73) Assignee: Taiguen Technology (Shen Zhen) Co., Ltd., Shenzhen (CN)

( * ) Notice: Subject to any disclaimer, the term of this patent is extended or adjusted under 35 U.S.C. 154(b) by 0 days.

(21) Appl. No.: 11/909,941

(22) PCT Filed: Mar. 23, 2006

(86) PCT No.: PCT/CN2006/000472

§ 371 (c)(1), (2), (4) Date: Jun. 12, 2008

(87) PCT Pub. No.: WO2006/102828

PCT Pub. Date: Oct. 5, 2006

(65) Prior Publication Data

US 2008/0261441 A1    Oct. 23, 2008

(30) Foreign Application Priority Data

Mar. 31, 2005    (CN) .................... 2005 1 0059676

(51) Int. Cl.
H01R 13/72    (2006.01)
(52) U.S. Cl. .................................................. 439/501
(58) Field of Classification Search ........... 439/501, 439/502
See application file for complete search history.

(56) References Cited

U.S. PATENT DOCUMENTS

| | | | |
|---|---|---|---|
| 5,422,957 A * | 6/1995 | Cummins | 439/501 |
| 6,337,444 B1 * | 1/2002 | Liao | 439/502 |
| 6,416,355 B1 * | 7/2002 | Liao | 439/501 |
| 6,733,328 B2 * | 5/2004 | Lin et al. | 439/501 |
| 7,052,281 B1 * | 5/2006 | Meyberg et al. | 439/501 |
| 2003/0207611 A1 * | 11/2003 | Lin et al. | 439/501 |
| 2003/0223286 A1 | 12/2003 | Lee | |
| 2005/0070153 A1 * | 3/2005 | Tang | 439/502 |

FOREIGN PATENT DOCUMENTS

| | | |
|---|---|---|
| CN | 2332695 Y | 8/1999 |
| CN | 2527543 Y | 12/2002 |
| CN | 2681403 Y | 2/2005 |
| JP | 2002297273 A | 10/2002 |

* cited by examiner

*Primary Examiner*—Briggitte R Hammond
(74) *Attorney, Agent, or Firm*—J.C. Patents

(57) ABSTRACT

A signal transmission wire with audio interface and USB interface, the wire is a four-core connection wire, one end of which is connected to a USB interface, the other end of which is connected to a dual-track audio interface; the four-core signal connection wire is further provided with a winder, the winder is a box, and a bobbin for intertwining the four-core connection wire is pivotally jointed in its cavity; two opening holes are set on the surface of the winder; the double ends of the four-core connection wire pass through the two opening holes respectively; the wire of the four-core connection wire is winded on the bobbin.

22 Claims, 7 Drawing Sheets

SIGNAL TRANSMISSION WIRE WITH AN AUDIO INTERFACE AND A USB INTERFACE

FIELD OF THE INVENTION

The present invention relates to a signal transmission wire with audio interface and USB interface, especially relates to a signal transmission wire with audio signal interface and USB data interface set at the double ends of four-core connection wire respectively.

BACKGROUND OF THE INVENTION

With the constant improvement of people's material life, spiritual life and regarding the features of fast pace and high mobility in modern people's work and life, various exquisite and powerful mobile electronic products continuously come out, such as mobile phone, PDA, MP3 player, mobile memory and lap-top computer and so on. These electronic gadgets, by being connected to large fixed electronic equipments, or by the mutual connection among these electronic gadgets, can complete the processing and transmission for a large amount of information and data, which brings great convenience for people's everyday work and at the same time, brings great enjoyment for people's daily life.

Because above electronic gadgets are all based on the processing and transmission of the electronic information or data, users can implement the mutual transmission of corresponding data or information by connecting their own electronic gadgets to other small mobile electronic devices or fixed electronic equipments according to their needs. However, the special interface and connecting wire are always needed for the information intercommunication among many electronic equipments. This causes that variously different connecting wires are too messy, which bring many practical troubles for users. These troubles are mainly embodied as following: users have to select the transmission wires with different functions at first when they transmit information among equipments according to different needs, and users have to maintain the transmission wires appropriately when they are not in use, at the same time, users also have to prevent the transmission wires from being broken because of being tied or bent too much.

On the other hand, because the development direction of current electronic gadgets is to expand more additional properties on the basis of continuously improving their original performance and at the same time, their volume is getting miniaturized farther. Therefore, traditional standard or non-standard USB data interfaces are getting more and more unsuitable to the rapid development of the micromation of the electronic gadgets because of their large volume. However, the micro signal transmission interfaces usually used on small player-style electronic equipments are generally coaxial audio I/O interfaces, which can be manufactured quite small and have many signal transmission wires so as to completely meet the need for audio I/O of the micro electronic gadgets.

In a word, how to solve the troubles brought by various messy connecting wires and how to reform the application mode of current USB data interfaces so as to make them suitable to the development trend of the mobile electronic gadgets towards miniaturization has already become an important problem necessary to be solved as soon as possible for manufacturers in the present art.

SUMMARY OF THE INVENTION

The object of the present invention is to provide a signal transmission wire with an audio interface and a USB interface regarding the situation that above current USB data interface has already been unsuitable to the rapid development of the micromation of electronic gadgets. The transmission wire of the present invention can realize information transmission through one transmission wire for audio signal and data signal by being connected to electronic equipment with audio/USB signal multiplexing interface.

The other object of the present invention is to provide a signal transmission wire with an audio and a USB interface regarding above trouble brought to users by various messy connecting wires. The transmission wire of the present invention can pack the wire itself by winder. When it is in-use, the transmission wire can be released properly.

In order to accomplish above objects, the present invention provides a signal transmission wire with an audio interface and a USB interface. It includes four-core connection wire with one end connected to a USB interface, the other end of the said four-core connection wire is connected to a dual-track audio interface; two audio signal ports of the said dual-track audio interface are correspondingly connected to two data signal ports of the said USB interface; the ground port of said dual-track audio interface is connected to the ground port of said USB interface; the controlling signal port of said dual-track audio interface is connected to the power port of said USB interface; a winder is further passed through said four-core connection wire, the winder is a box with a bobbin pivotally jointed in the cavity thereof for intertwining said four-core connection wire; two opening holes are opened on the surface of said winder; one end of said four-core connection wire passes through one opening hole of said two opening holes, the other end of said four-core connection wire passes through the other opening hole of said two opening holes; and the wire itself of said four-core connection wire is winded on said bobbin; when said bobbin is rotating, said four-core connection wire can be ingathered into or released out of said box.

It can be seen from above technical solution that, the present invention by correspondingly connecting the four dual-track audio interface to four transmission wires of current USB data interface one by one, and by the package of winder, make the above two problems that the many connecting lines are messy and the volume of USB data interface is big be solved well synchronously so as to meet users' many practical needs.

The technical solution of the present invention will be more fully described by the following detailed description of preferred embodiments of the present invention which is to be considered together with the accompanying drawings.

DETAILED DESCRIPTION OF THE PREFERRED EMBODIMENTS

Embodiment 1

Figure 1:
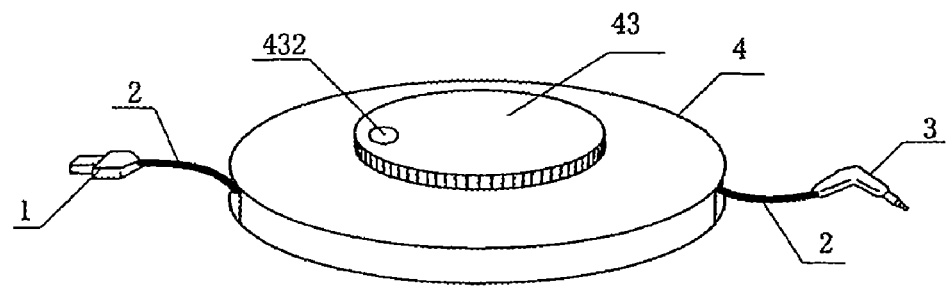
FIG. 1 is a sketch of the structure in Embodiment 1 of the present invention

As shown in FIG. 1, the present embodiment provides a signal transmission wire with audio and USB interface, wherein it includes a four-core connection wire 2 with one end connected to the USB interface 1, the other end of the four-core connection wire 2 is connected to a dual-track audio interface 3. Two audio signal ports of the dual-track audio interface 3 are correspondingly connected to the two data signal ports of the USB interface 1. The ground port of the dual-track audio interface 3 is correspondingly connected to the ground port of the USB interface 1. The controlling signal port of the dual-track audio interface 3 is connected to the power port of the USB interface 1.

Figure 2:
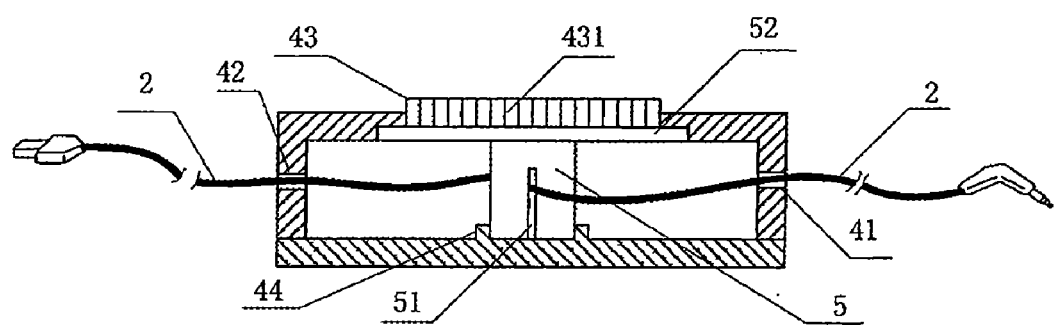
FIG. 2 is a sketch of the inner structure in the embodiment shown in FIG. 1.

A winder 4 is passed through the four-core connection wire 2. As shown in FIG. 2, the winder 4 is a box with a bobbin 5 pivotally jointed in the cavity thereof, and the bobbin 5 is used for intertwining the four-core connection wire 2. Two opening holes are opened on the surface of the winder 4, one of which is opening hole 41 and the other is opening hole 42 respectively. One end of the four-core connection wire 2 passes through one opening hole 41. The other end of the four-core connection wire 2 passes through the other opening hole 42. The wire itself of the four-core connection wire 2 is winded on the bobbin 5. When the bobbin 5 is rotating, the four-core connection wire 2 can be ingathered into or released out of the box of winder 4.

In the present embodiment, the USB interface 1 can be USB plug or USB socket. The USB plug can be standard big or small plug, and the USB socket also can be standard big or small socket. The dual-track audio interface 3 can be four-core audio plug or four-core audio socket.

Figure 3:
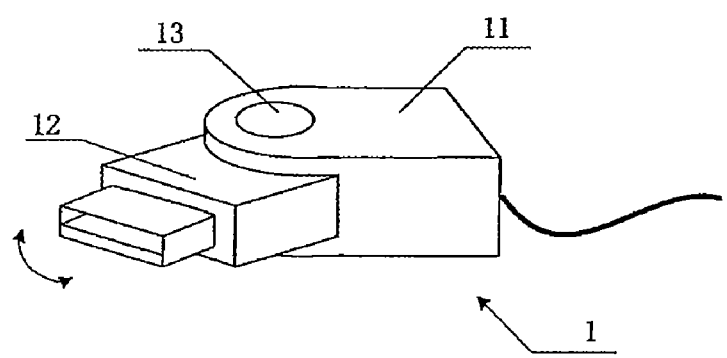
FIG. 3 is a sketch of a USB interface of the present invention.

When the USB interface 1 is connected to the USB interface of a computer or other electronic equipments, in order to protect the USB interface 1 from data or signal mistakes caused by being broken or poor contact, and at the same time to be conveniently used, it can be manufactured as the structure shown in FIG. 3, 4.

In FIG. 3, the USB interface 1 includes a fixing part 11 and a movable part 12 which is pivotally jointed on the fixing part 11 by a pivot 13 and can horizontally rotate along the direction of the two-way arrow in the figure. The movable part 12 is used for inserting the USB interfaces of other electronic equipments. Four electrical contact points on the movable part 12 are connected to four-core connection wire 2 by the wires passed in the pivot 13 and the fixing part 11.

Figure 4:
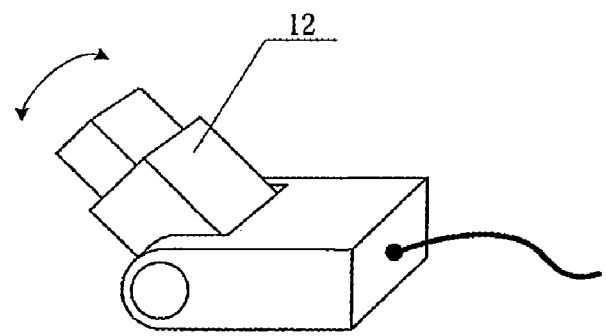
FIG. 4 is a sketch of another USB interface of the present invention.

The difference between FIG. 4 and FIG. 3 lies in the rotation direction of the movable part 12 is along the vertical direction of two-way arrow as shown in the figure. Of course, the solutions shown in FIG. 3 and FIG. 4 can be combined so that the USB interface can be manufactured to be able to rotate along any direction based on the Universal Joints Principle.

As shown in FIG. 1 and FIG. 2, the specific structure of the winder 4 in the present embodiment is as follows: a rotating disk 43 is set on the winder 4, one surface of the rotating disk 43 is convexly set on the outer surface of the box; the other surface of the rotating disk 43 passes into the box and forms as a whole with one end surface of the bobbin 5. The other end surface of the bobbin 5 is pivotally jointed with the inner surface of the box. The style of pivotally jointing is setting a ring-shaped convex edge 44 at the position corresponding to bobbin 5 in the box. The inside diameter of the ring-shaped convex edge 44 is matched with the diameter of bobbin 5. The other end of bobbin 5 is set inside the ring-shaped convex edge 44 so as to form pivotally jointing structure. A clamp mechanism is set on the bobbin 5 for clamping the four-core connection wire 2. The clamp mechanism is a clamping wire groove 51 passing through the bobbin 5, its width matches with the line diameter of four-core connection wire 2 so as to make the four-core connection wire 2 be clamped. When the bobbin 5 is rotating, a part extending out of the box of the four-core connection wire 2 shrinks towards the inner of the box and is winded on the bobbin 5. When it is used, according to practical length of the transmission wire, the USB interface 1 and the dual-track audio interface 3 are pulled out towards the outside of the box at the same time.

In the present embodiment, axial movement easily happens because the bobbin 5 is floatingly set in the ring-shaped convex edge 44. Therefore, a baffle 52 in the box is set at the end surface where bobbin 5 and rotating disk 43 are fixed together. The diameter of baffle 52 is bigger than the diameter of rotating disk 43 so as to prevent bobbin 5 from moving along the axial direction.

In order to facilitate the user's operation, convex arrises 431 are set around the side of rotating disk 43 for toggling and a hollow 432 is set on the surface of rotating disk 43.

Embodiment 2

Figure 5:
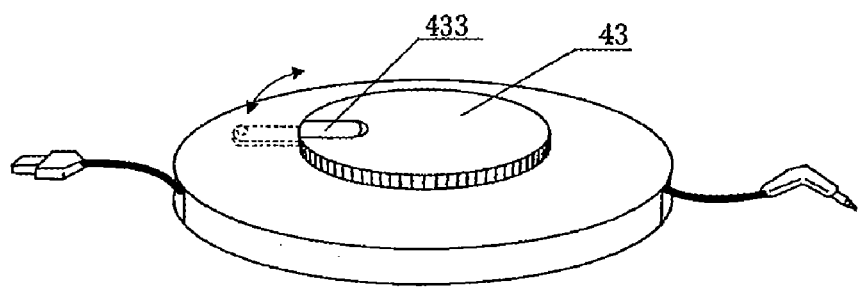
FIG. 5 is a sketch of the structure in Embodiment 2 of the present invention.

As shown in FIG. 5, the difference between the present embodiment and above embodiment 1 lies in that a hollow groove is set at the surface edge of the rotating disk 43 and a folding handle 433 is pivotally jointed in the hollow groove. The folding handle 433 can be folded along the direction of the two-way arrow in the figure. When it's needed to operate the wire ingathering, the user can toggle the rotating disk 43 to rotate by turning on and toggling the folding handle 433.

Embodiment 3

Figure 6:
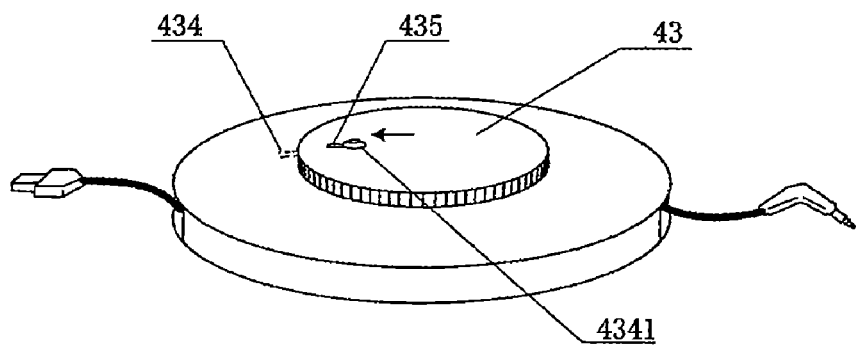
FIG. 6 is a sketch of the structure in Embodiment 3 of the present invention.

As shown in FIG. 6, the difference between the present embodiment and above embodiment 2 lies in that an extension handle 434 is set in the rotating disk 43 itself. A pushing button 4341 is set on the extension handle 434 and extends out of the surface of rotating disk 43 by passing through a groove

435. The user can toggle the pushing button 4341 to make the extension handle 434 extend out of or retreat into the rotating disk 43.

Embodiment 4

Figure 7:
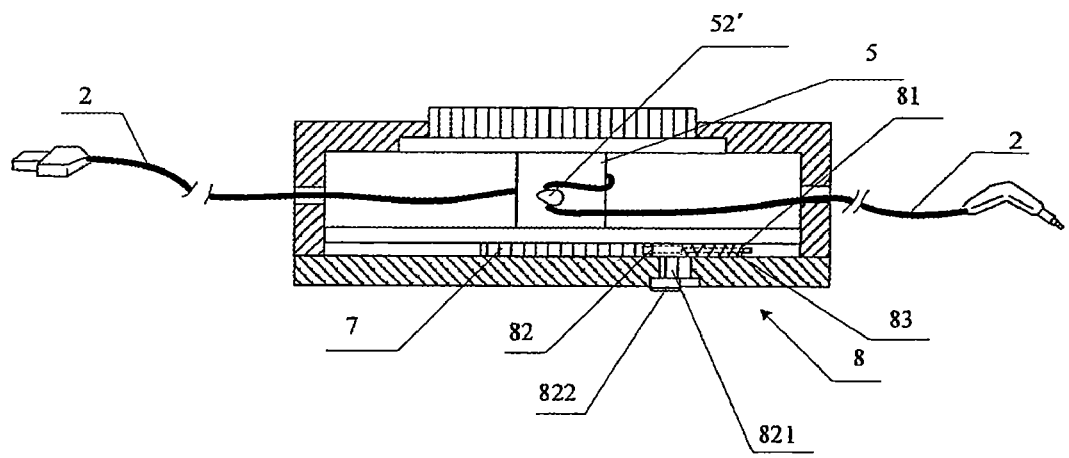
FIG. 7 is a sketch of the structure in Embodiment 4 of the present invention.
Figure 8:
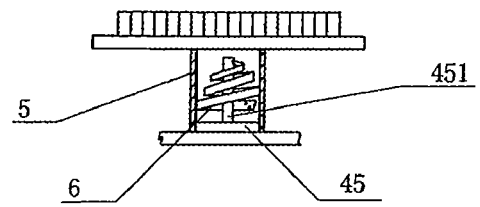
FIG. 8 is a sketch of the inner structure of the bobbin in the embodiment shown in FIG. 7.

As shown in FIGS. 7 and 8, the big difference between the present embodiment and above embodiment 1 lies in that a reset spring 6 is set in the bobbin 5 for making the bobbin 5 produce inversely rotatory force in the situation of rotating and releasing four-core connection wire 2. A stopping device is set on the bobbin 5. The stopping device is used for preventing the bobbin 5 from reset rotating inversely. The stopping device consists of ratchet wheel 7 nesting on the bobbin 5 and flexible bolt 8. The flexible bolt 8 includes a bolt cover 81 fixed at the inner surface of the box and a bolt pillar 82 mounted in the bolt cover 81 with one end extending outward and inserted between the teeth of ratchet wheel 7. One part of bolt pillar 82 located in the bolt cover 81 is touched against with the spring 83 mounted in it and used for making the bolt pillar 82 extend outward. A toggle rod 821 is set on the bolt pillar 82, and the toggle rod 821 extends out of the box by passing through the bolt cover 81 and the corresponding groove preset on the box, and connects with the toggle button 822 set out of the box. Because of the ratchet wheel 7, the pivotally jointing style of the bobbin 5 and the box adopts the solution as shown in FIG. 8. A convex pillar 45 is convexly set at the joint of the box's inner surface and the bobbin 5. The convex pillar 45 is matched and set in the bobbin 5. A dead rod 451 is further fixed at the center of convex pillar 45. The reset spring 6 adopts clockwork spring with one end fixed on the dead rod 451 and another end fixed on the inner wall of bobbin 5. When the bobbin 5 is rotating, the reset spring 6 is shrunk to produces inversely rotatory force.

When the present embodiment is in-use, after an operator rotates and releases the four-core connection wire 2, because the top end of the bolt pillar 82 is inserted between the teeth of ratchet wheel 7, the inversely rotatory force of reset spring 6 can't cause bobbin 5 to inversely rotate. When the four-core connection wire 2 is needed to be shrunk into the box, the operator can make the bolt pillar 82 separate from the ratchet wheel 7 by toggling the toggle button 822, so as to cause the bobbin 5 to automatically inversely rotate to operate the wire ingathering. After the toggle button 822 is released, under the effect of the spring 83's touching against, the top end of bolt pillar 82 is reinserted between the teeth of ratchet wheel 7.

Figure 9:
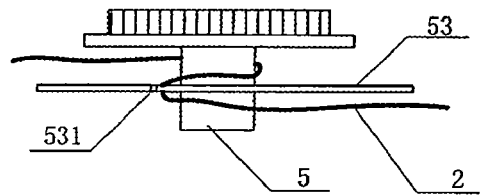
FIG. 9 is a sketch of a clamp mechanism in the embodiment shown in FIG. 7.

In addition, the clamp mechanism of the present embodiment is a clamp 52' which is set on the bobbin 5. The clamp 52' can clamp the four-core connection wire 2 on the bobbin 5 in advance so as to realize intertwining. The clamp mechanism can also be set as the style shown in FIG. 9. A round clapboard 53 is nested and fixed on the bobbin 5. A clamping wire groove 531 is set on the round clapboard 53 which is opened inward from the edge thereof. The four-core connection wire 2 is clamped in the clamping wire groove 531 in advance. When the bobbin 5 is rotating, the four-core connection wire 2 is divided into two groups and separately intertwined on the bobbin 5 so as to facilitate maintaining the four-core connection wire 2 tidy.

Embodiment 5

Figure 10:
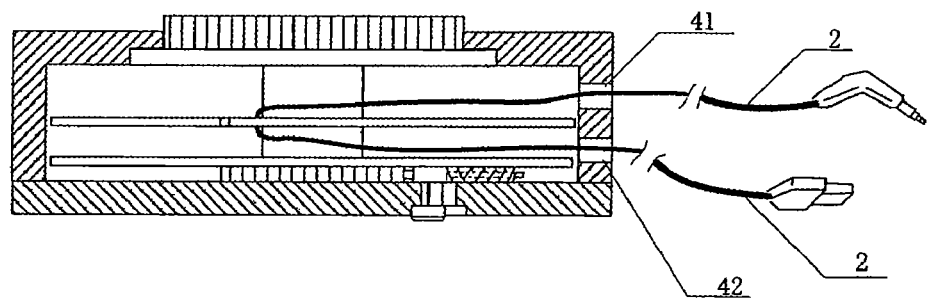
FIG. 10 is a sketch of the structure in Embodiment 5 of the present invention.
Figure 11:
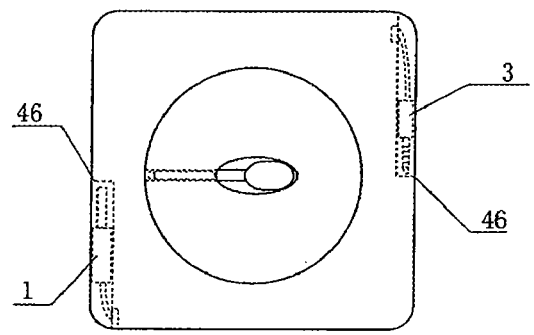
FIG. 11 is a sketch of the structure in Embodiment 6 of the present invention.

As shown in FIG. 10, the present embodiment is improved based on above Embodiment 4, the difference thereof lies in that the opening hole 41 and the opening hole 42 on the box are opened at the same side so as to make the four-core connection wire 2 be able to be released or ingathered in the same direction synchronously.

Embodiment 6

As shown in FIG. 1, the present embodiment is similar to Embodiment 3, the difference thereof lies in that the shape of the box is rectangular, and two containing grooves 46 are set on the side of the box and located at the edge of the opening hole 41 and the opening hole 42 respectively. The containing groove 46 is used for containing the dual-track audio interface 3 and the USB interface 1. After the four-core connection wire is completely ingathered into the box, the dual-track audio interface 3 and the USB interface 1 can be fastened in the containing groove 46 so as to cause the winder 4 to be formed as a whole and at the same time provide good protection for the dual-track audio interface 3 and the USB interface 1.

Embodiment 7

Figure 12:
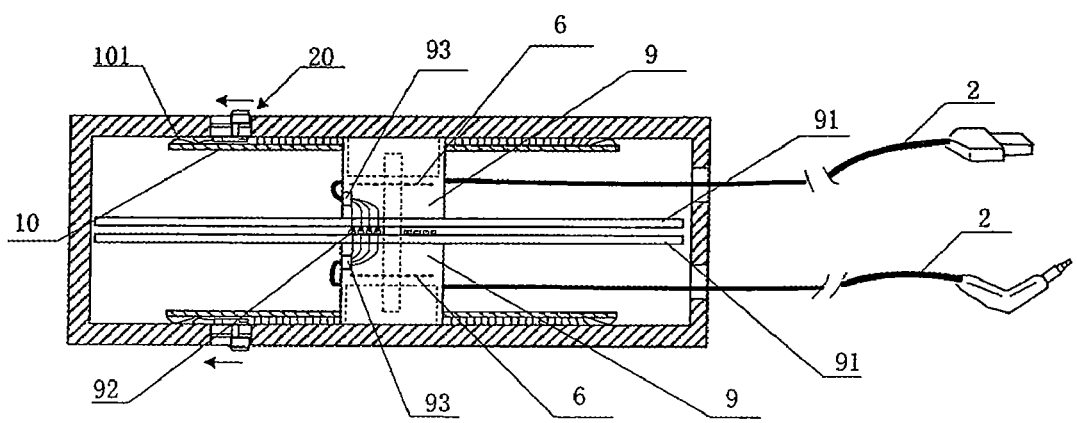
FIG. 12 is a sketch of the structure in Embodiment 7 of the present invention.

As shown in FIG. 12, the difference between the present embodiment and above Embodiment 5 lies in that the rotating disk is canceled. The bobbin consists of two half coiling axles 9 which can rotate simultaneously or respectively, and are concentrically overlapped up and down and pivotally jointed together in the box, on the connecting surfaces of two half coiling axles, two wire blocking boards 91 are fixed on them respectively, and quadrigeminate electrical brushes 92 are set between two wire blocking boards 91. The four-core connection wire 2 is divided into two parts which are winded on the two half coiling axles 9 respectively, and the two parts of four-core connection wire 2 are electrically connected one by one by the connecting wire port 93 and the quadrigeminate electrical brushes 92 located in the box.

Reset springs 6 are set in the two half coiling axles 9 for inversely rolling the four-core connection wire 2; two manual stopping devices are set respectively between the two half coiling axles 9 and the box for preventing or releasing the half coiling axle 9 from inversely rolling the four-core connection wire 2, the manual stopping device consists of a rotating part 10 fixed on the half coiling axle 9 and a controlling part 20 fixed on the box.

Figure 13:
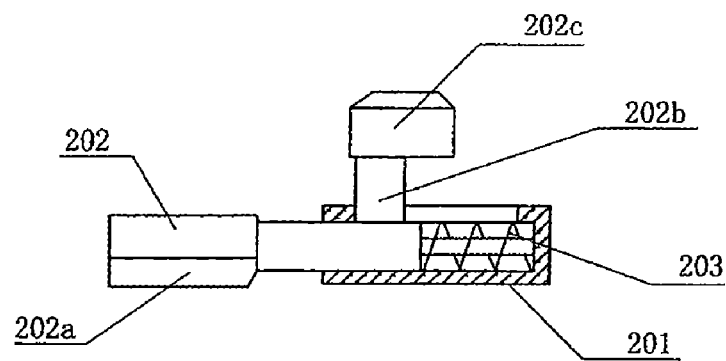
FIG. 13 is a sketch of the structure of the controlling part in the embodiment shown in FIG. 12.

The rotating part 10 is a round plate nested at the end where the half coiling axle 9 is pivotally jointed with the box. Multiple convex teeth 101 are distributed along the outer edge of the surface of the round plate facing the box. Said multiple convex teeth 101 are formed a ring-shaped. The structure of the controlling part is as shown in FIG. 13 and includes a pillar-shaped shell 201 fixed at the inner surface of the box with one end opening and a stopping pin 202 mounted in the pillar-shaped shell 201 with one end extending outward. The stopping pin 202 is provided with stopping teeth 202a at the outer end thereof matched with the multiple convex teeth 101. The part of the stopping pin 202 located in the pillar-shaped shell 201 is touched against with the spring 203 mounted in the pillar-shaped shell 201 and used for making the stopping pin 202 extend outward. A toggle rod 202b is set on the stopping pin 202, and the toggle rod 202b extends out of the box by passing through the pillar-shaped shell 201 and the corresponding groove preset on the box and connects with the toggle button 202c set out of the box.

Figure 14:
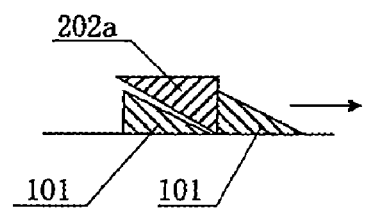
FIG. 14 is a sketch of the matching relationship of the convex teeth and the stopping teeth in the embodiment shown in FIG. 12.

The cross section shape and the matching relationship of the multiple convex teeth 101 and the stopping teeth 202a are as shown in FIG. 14. It can be seen from the figure, the cross section shape of the multiple convex teeth 101 and the stopping teeth 202a are both right-angled triangle, and the vertical surface of the multiple convex teeth 101 is contact with the vertical surface of the stopping teeth 202a. When half coiling axle 9 rotates and the multiple convex teeth 101 moves along the direction of arrow in the figure, under the effect of slope, the rotating part 10 slips under the stopping teeth 202a because of the material's flexible transformation. When the rotating part 10 stops rotating, i.e. half coiling axle 9 stops rolling and rotating, the vertical surface of stopping teeth 202a keeps close against one vertical surface of the convex teeth 101 and prevents the convex teeth 101 from inversely moving because of the counterforce of the reset spring 6. When the wire is going to be ingathered, operator only need to toggle the toggling button 202c so as to make the stopping pin 202 shrink into the pillar-shaped shell 201. The stopping teeth 202a is separated from convex teeth 101 so as to make the stopping force disappear. The rotating part 10 rotates under the counterforce of the reset spring 6 so that the four-core connection wire 2 is ingathered into the box.

In the present embodiment, the bobbin consists of two half coiling axles 9 which can rotate simultaneously or respectively and are concentrically overlapped up and down, therefore, users can choose to release the four-core connection wire 2 simultaneously or respectively according to their needs. When the four-core connection wire 2 is going to be withdrawn, the situation is similar. Whatever ingather and release simultaneously or respectively, four wire ports 93 and the quadrigeminate electrical brushes 92 can always provide good electrical connection for the two parts of the four-core connection wire 2.

Figure 15:
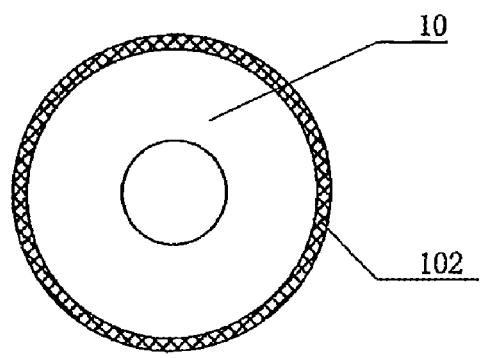
FIG. 15 is a sketch of the structure of another rotating part in the embodiment shown in FIG. 12.

In the present embodiment, the rotating part 10 can be provided with a ring-shaped damping tape 102 on the surface thereof distributed along the outer edge as shown in FIG. 15. The ring-shaped damping tape 102 is made of the material with good friction characteristics and at the same time, friction material is also set on the outer end of the stopping pin 202 correspondingly so as to play a role in stopping.

Embodiment 8

Figure 16:
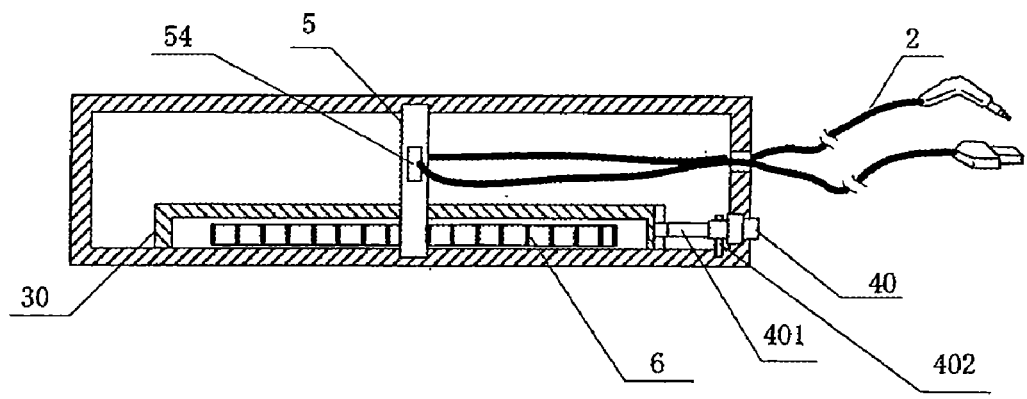
FIG. 16 is a sketch of the side cross section structure in Embodiment 8 of the present invention.
Figure 17:
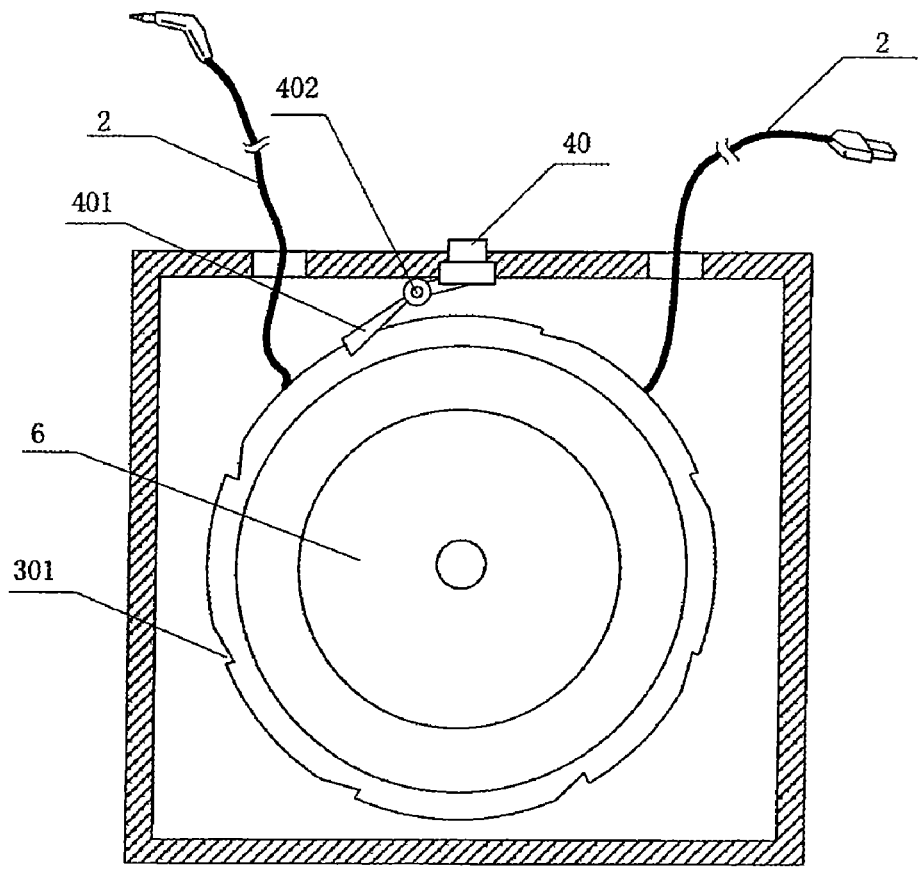
FIG. 17 is a sketch of the bottom cross section structure in the embodiment shown in FIG. 16.

As shown in FIGS. 16, 17, the bobbin 5 of the present embodiment is a rotating axle pivotally jointed in the middle part of the box. The rotating axle is provided with a clamping hole 54 for being passed by the four-core connection wire 2. A round disk-shaped hollow box 30 is nested and fixed at one end of the rotating axle. A reset spring 6 (clockwork spring can be adopted) is set in the round disk-shaped hollow box 30 for inversely rolling the four-core connection wire 2. The round disk-shaped hollow box 30 is provided with homodromous hollow skew teeth 301 dispersively dug on the sides thereof. A stopping key 40 is set at the side of the box. A stopping rod 401 is slantingly set at the bottom of the stopping key 40 which is located inside of the box and is touched against with the side of the round disk-shaped hollow box 30. The end of the stopping rod 401 has tine matched with the hollow skew teeth 301. The end where the stopping rod 401 is jointed with the bottom of the stopping key 40 is pivotally jointed with the box by a pivot 402.

When mounts the present embodiment, firstly make the four-core connection wire 2 pass through the clamping hole 54 and be winded on the rotating axle, and at the same time, put the reset spring 6 into the round disk-shaped hollow box 30 in the traditional way of installation. When the four-core connection wire 2 is released, the rotating axle drives the round disk-shaped hollow box 30 rotate so as to make the inside reset spring 6 shrink. When stopping releasing the wire, the tine of the end of the stopping rod 401 is inserted into the hollow skew tooth 301 so as to prevent the round disk-shaped hollow box 30 from inversely rotating. After it is used, when operators press the stopping key 40, the stopping rod 401 raises and the tine of the end is separated from the hollow skew tooth 301. The round disk-shaped hollow box 30 inversely rotates under the effect of the reset spring 6 so as to ingather the four-core connection wire 2 into the box and rewinded it on the axle. When the wire is released in the present embodiment, it can be released sectionally according to the need. During manufacturing, the space between the hollow skew teeth 301 can be configured discretionarily, the size of which determines the length of each section of the four-core connection wire 2 released sectionally.

Embodiment 9

Figure 18:
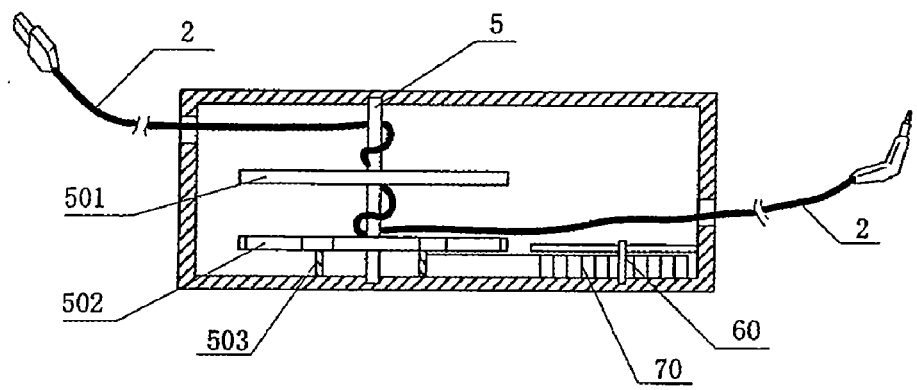
FIG. 18 is a sketch of the side cross section structure in Embodiment 9 of the present invention.
Figure 19:
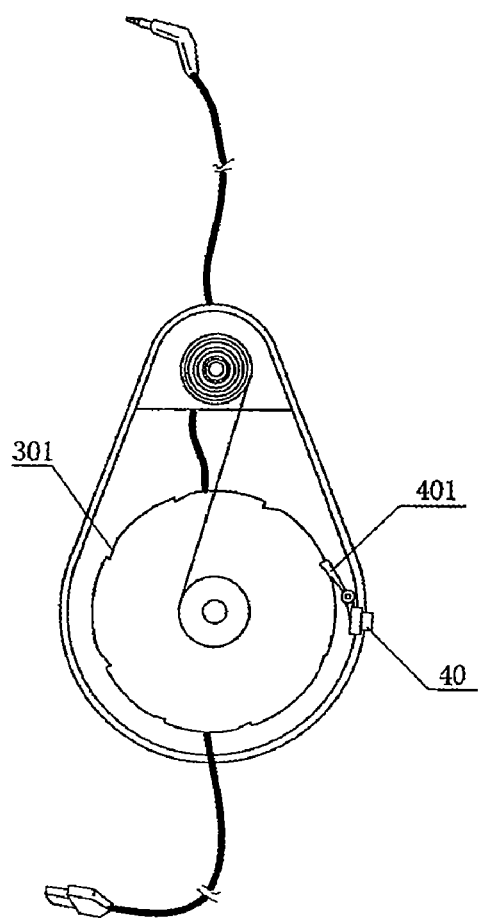
FIG. 19 is a sketch of the bottom cross section structure in the embodiment shown in FIG. 18.

As shown in FIGS. 18, 19, the difference between the present embodiment and above embodiment 1 lies in that two clapboards are nested and fixed on the bobbin 5 at intervals, wherein a round ring rib 503 is set on the lower surface of the lower clapboard 502 facing the box with the bobbin 5 as the center of circle. A fixing axle 60 is further set in the box at one side of the round ring rib 503. A multilayer ring-shaped torque force spring 70 is nested on the fixing axle 60. The center end of the multilayer ring-shaped torque force spring 70 is clamped on the fixing axle 60. The other end at the outer side of the multilayer ring-shaped torque force spring 70 is clamped at the surface of the round ring rib 503. The four-core connection wire 2 is intertwined on the bobbin 5 and is set respectively in two room, one of which is the room formed between the lower clapboard 502 and the upper clapboard 501 and the other formed between the upper clapboard 501 and the inner surface of the box. Hollow skew teeth 301 are dispersively dug at the side of the lower clapboard 502 the same as above Embodiment 8. The stopping key 40 and the stopping rod 401 are set at the side of the box the same as above Embodiment 8. The end of the stopping rod 401 has tine matched with the hollow skew teeth 301.

During manufacturing of the present embodiment, intertwine the four-core connection wire 2 on the bobbin 5 in advance. When it is in-use and the four-core connection wire 2 is released, the bobbin 5 rotates so that the multilayer ring-shaped torque force spring 70 produces inversely force because of being intertwined at the surface of the round ring rib 503. The inversely force can provide inversely rotatory force for the bobbin 5 when the wire is withdrawn. The effect of the stopping key 40, the stopping rod 401 and the hollow skew teeth 301 dispersively dug on the side of the lower clapboard 502 is identical to above Embodiment 8, so there is no need to elaborate any further.

Finally, it should be understood that the above embodiments are only used to explain, but not to limit the technical solution of the present invention. In despite of describing the present invention in detail with reference to the preferred embodiments, it should be understood that various modifications, changes or equivalent replacements could be made by an ordinary person skilled in the relevant field without departing from the spirit and scope of the technical solution of the present invention, which should be covered in the extent of the claims of the present invention.

What is claimed is:

1. A signal transmission wire with an audio interface and a USB interface, comprising: said signal transmission wire is a four-core connection wire, one end of which is connected to a USB interface, the other end of said four-core connection wire is connected to a dual-track audio interface; two audio signal ports of said dual-track audio interface are correspondingly connected to two data signal ports of said USB interface; the ground port of said dual-track audio interface is connected to the ground port of said USB interface; the controlling signal port of said dual-track audio interface is connected to the power port of said USB interface;

said four-core connection wire passes through a winder; the winder is a box with a bobbin pivotally jointed in the cavity thereof for intertwining said four-core connection wire; two opening holes are opened on the surface of said winder; two ends of said four-core connection wire pass through said two opening holes respectively; and the wire of said four-core connection wire is winded on said bobbin; and a rotating disk is set on said winder; one surface of the rotating disk is convexly set on the outer surface of said box; the other surface of said rotating disk passes into said box and fixes or forms as a whole with one end surface of said bobbin; the other end surface of said bobbin is pivotally jointed with the inner surface of said box; and a clamp mechanism is set on said bobbin for clamping said four-core connection wire.

2. A signal transmission wire with an audio interface and a USB interface as claimed in claim 1, characterized in that said USB interface is a USB plug or a USB socket; said USB plug is a standard big or small plug; and said USB socket is a standard big or small socket.

3. A signal transmission wire with an audio interface and a USB interface as claimed in claim 1, characterized in that said USB interface includes a fixing part and a movable part which is pivotally jointed on said fixing part by a pivot and can rotate, and is used for inserting the USB interface of another electronic equipment; four electrical contact points on said movable part are connected to said four-core connection wire by the wire passed in said pivot and said fixing part.

4. A signal transmission wire with an audio interface and a USB interface as claimed in claim 1, characterized in that said dual-track audio interface is a four-core audio plug or a four-core audio socket.

5. A signal transmission wire with an audio interface and a USB interface as claimed in claim 1, characterized in that a baffle is set at the end surface where said bobbin is fixed with said rotating disk in said box for preventing said bobbin from moving along the direction of the axle line; said clamp mechanism is a clamping wire groove opened on said bobbin or a clamp set on said bobbin.

6. A signal transmission wire with an audio interface and a USB interface as claimed in claim 1, characterized in that convex arrises are set around the edge of said rotating disk for toggling.

7. A signal transmission wire with an audio interface and a USB interface as claimed in claim 1, characterized in that a folding handle or a extension handle or a hollow is set on the surface of said rotating disk for toggling.

8. A signal transmission wire with an audio interface and a USB interface as claimed in claim 1, characterized in that a reset spring is set in said bobbin for making the bobbin produce inversely rotatory force in the situation of releasing said four-core connection wire; a stopping device is set on said bobbin for preventing said bobbin from reset rotating inversely; said stopping device consists of ratchet wheel nested on said bobbin and flexible bolt; said flexible bolt includes a bolt cover fixed at the inner surface of said box and a bolt pillar mounted in the bolt cover with one end extending outward and inserted between the teeth of said ratchet wheel; one part of the bolt pillar located in said bolt cover is touched against with the spring mounted in it and used for making said bolt pillar extend outward; a toggle rod is set on said bolt pillar; and the toggle rod extends out of said box by passing through said bolt cover and the corresponding groove preset on said box, and connects with the toggle button set out of the box.

9. A signal transmission wire with an audio interface and a USB interface as claimed in claim 1, characterized in that containing grooves are set on the side of the box and located at the edge of the opening holes respectively for containing said USB interface and said dual-track audio interface.

10. A signal transmission wire with an audio interface and a USB interface, wherein said signal transmission wire is a four-core connection wire, one end of which is connected to a USB interface, the other end of said four-core connection wire is connected to a dual-track audio interface: two audio signal ports of said dual-track audio interface are correspondingly connected to two data signal ports of said USB interface; the ground port of said dual-track audio interface is connected to the ground port of said USB interface; the controlling signal port of said dual-track audio interface is connected to the power port of said USB interface;

said four-core connection wire passes through a winder; the winder is a box with a bobbin pivotally jointed in the cavity thereof for intertwining said four-core connection wire; two opening holes are opened on the surface of said winder; two ends of said four-core connection wire pass through said two opening holes respectively; and the wire of said four-core connection wire is winded on said bobbin; and said bobbin consists of two half coiling axles which can rotate simultaneously or respectively, and are concentrically overlapped up and down and pivotally jointed together in said box; on the connecting surfaces of said two half coiling axles, two wire blocking boards are fixed on them respectively; quadrigeminate electrical brushes are set between two wire blocking boards; said four-core connection wire is divided into two parts which are winded on said two half coiling axles respectively; the two parts of four-core connection wire are electrically connected one by one by four wire ports and said quadrigeminate electrical brushes located in said box; reset springs are set in said two half coiling axles for inversely rolling said four-core connection wire; two manual stopping devices are set respectively between two half coiling axles and said box for preventing or releasing said half coiling axle from inversely rolling said four-core connection wire; the manual stopping device consists of a rotating part fixed on said half coiling axle and a controlling part fixed on said box; in the situation of stopping, said controlling part contacts with said rotating part so as to make the rotating part stop rotating.

11. A signal transmission wire with an audio interface and a USB interface as claimed in claim 10, characterized in that said rotating part is a round plate nested at the end where said half coiling axle is pivotally jointed with said box; multiple convex teeth are distributed along the outer edge of the surface of the round plate facing the box; said multiple convex teeth are formed as ring-shaped; said controlling part includes a pillar-shaped shell fixed at the inner surface of said box with one end opening and a stopping pin mounted in the pillar-shaped shell with one end extending outward; the stopping pin is provided with stopping teeth at the outer end thereof matched with said multiple convex teeth; the part of said stopping pin located in said pillar-shaped shell is touched against with the spring mounted in the pillar-shaped shell and used for making said stopping pin extend outward; a toggle rod is set on said stopping pin; the toggle rod extends out of said box by passing through said pillar-shaped shell and the corresponding groove preset on said box and connects with the toggle button set out of the box.

12. A signal transmission wire with an audio interface and a USB interface, wherein said signal transmission wire is a four-core connection wire, one end of which is connected to a USB interface, the other end of said four-core connection wire is connected to a dual-track audio interface; two audio signal ports of said dual-track audio interface are correspondingly connected to two data signal ports of said USB interface; the ground port of said dual-track audio interface is connected to the ground port of said USB interface; the controlling signal port of said dual-track audio interface is connected to the power port of said USB interface;

said four-core connection wire passes through a winder; the winder is a box with a bobbin pivotally jointed in the cavity thereof for intertwining said four-core connection wire; two opening holes are opened on the surface of said winder; two ends of said four-core connection wire pass through said two opening holes respectively; and the wire of said four-core connection wire is winded on said bobbin; and said bobbin is a rotating axle pivotally jointed in the middle part of said box, and a round disk-shaped hollow box is nested and fixed at one end thereof; a reset spring is set in the round disk-shaped hollow box for inversely rolling said four-core connection wire; said round disk-shaped hollow box is provided with homodromous hollow skew teeth dispersively dug on the sides thereof; a stopping key is set at the side of said box; a stopping rod is slantingly set at the bottom of the stopping key which is located inside of said box and is touched against with the side of said round disk-shaped hollow box; the end of the stopping rod has tine matched with said hollow skew teeth; and the end where said stopping rod is jointed with the bottom of said stopping key is pivotally jointed with said box.

13. A signal transmission wire with an audio interface and a USB interface, wherein said signal transmission wire is a four-core connection wire, one end of which is connected to a USB interface, the other end of said four-core connection wire is connected to a dual-track audio interface; two audio signal ports of said dual-track audio interface are correspondingly connected to two data signal ports of said USB interface; the ground port of said dual-track audio interface is connected to the ground port of said USB interface; the controlling signal port of said dual-track audio interface is connected to the power port of said USB interface;

said four-core connection wire passes through a winder; the winder is a box with a bobbin pivotally jointed in the cavity thereof for intertwining said four-core connection wire; two opening holes are opened on the surface of said winder; two ends of said four-core connection wire pass through said two opening holes respectively; and the wire of said four-core connection wire is winded on said bobbin; and two clapboards are nested and fixed on the bobbin at intervals, wherein a round ring rib is set on the lower surface of the lower clapboard facing the box with the bobbin as the center of circle; a fixing axle is set in said box at one side of said round ring rib; a multilayer ring-shaped torque force spring is nested on the fixing axle; the center end of the multilayer ring-shaped torque force spring is clamped on said fixing axle; the other end at the outer side of the multilayer ring-shaped torque force spring is clamped at the surface of said round ring rib; said four-core connection wire is intertwined on said bobbin and is set respectively in two rooms, one of which is the room formed between the lower clapboard and the upper clapboard and the other formed between the upper clapboard and the inner surface of the box; homodromous hollow skew teeth are dispersively dug on the side of said lower clapboard; a stopping key is set at the side of said box; a stopping rod is slantingly set at the bottom of the stopping key located inside the said box and is touched against with the side of said clapboard; the end of the stopping rod has tine matched with said hollow skew teeth; and the end where said stopping rod is jointed with the bottom of said stopping key is pivotally jointed with said box.

14. A signal transmission wire with an audio interface and a USB interface as claimed in claim 13, characterized in that said USB interface is USB plug or USB socket; said USB plug is a standard big or small plug; and said USB socket is a standard big or small socket.

15. A signal transmission wire with an audio interface and a USB interface as claimed in claim 13, characterized in that said USB interface includes a fixing part and a movable part which is pivotally jointed on said fixing part by a pivot and can rotate, and is used for inserting the USB interface of another electronic equipment; four electrical contact points on said movable part are connected to said four-core connection wire by the wire passed in said pivot and said fixing part.

16. A signal transmission wire with an audio interface and a USB interface as claimed in claim 13, characterized in that said dual-track audio interface is a four-core audio plug or a four-core audio socket.

17. A signal transmission wire with an audio interface and a USB interface as claimed in claim 10, characterized in that said USB interface is USB plug or USB socket; said USB plug is a standard big or small plug; and said USB socket is a standard big or small socket.

18. A signal transmission wire with an audio interface and a USB interface as claimed in claim 10, characterized in that said USB interface includes a fixing part and a movable part which is pivotally jointed on said fixing part by a pivot and can rotate, and is used for inserting the USB interface of another electronic equipment; four electrical contact points on said movable part are connected to said four-core connection wire by the wire passed in said pivot and said fixing part.

19. A signal transmission wire with an audio interface and a USB interface as claimed in claim 10, characterized in that said dual-track audio interface is a four-core audio plug or a four-core audio socket.

20. A signal transmission wire with an audio interface and a USB interface as claimed in claim 12, characterized in that said USB interface is USB plug or USB socket; said USB plug is a standard big or small plug; and said USB socket is a standard big or small socket.

21. A signal transmission wire with an audio interface and a USB interface as claimed in claim 12, characterized in that said USB interface includes a fixing part and a movable part which is pivotally jointed on said fixing part by a pivot and can rotate, and is used for inserting the USB interface of another electronic equipment; four electrical contact points on said movable part are connected to said four-core connection wire by the wire passed in said pivot and said fixing part.

22. A signal transmission wire with an audio interface and a USB interface as claimed in claim 12, characterized in that said dual-track audio interface is a four-core audio plug or a four-core audio socket.

* * * * *